Sept. 25, 1956   C. W. GADD   2,764,020
VIBRATION PICK-UP DEVICE
Filed April 29, 1953
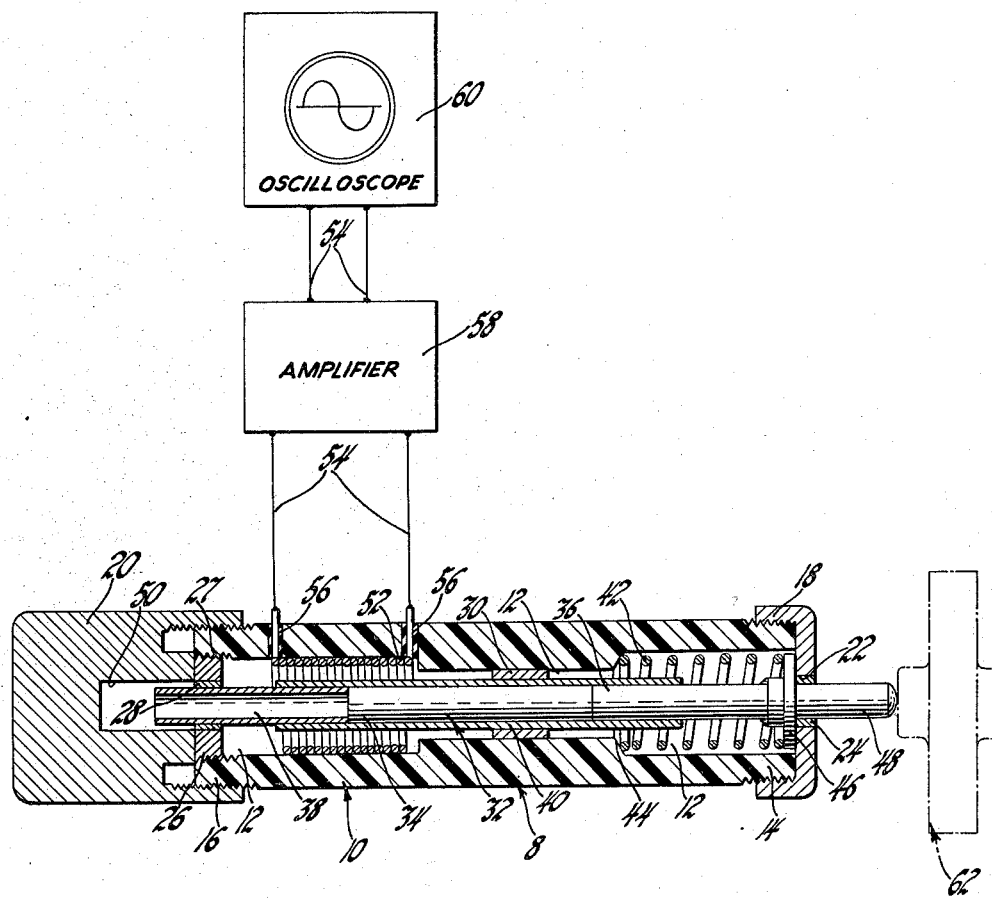
INVENTOR
*Charles W. Gadd*
BY *L. O. Burch*
ATTORNEY

2,764,020

VIBRATION PICK-UP DEVICE

Charles W. Gadd, Orchard Lake, Mich., assignor to General Motors Corporation, Detroit, Mich., a corporation of Delaware Application April 29, 1953, Serial No. 351,859

3 Claims. (Cl. 73—71.4)

This invention relates to a pick-up device responsive to rapid transient distortions and capable of measuring the rate of such distortions.

In the testing of structural members subject to rapid transient distortions, it is desirable to be able to detect not only the amount of displacement, but also the rate of displacement to enable computation of the extent to which a vibrating surface is subjected to stresses and strains and the likelihood of such a surface radiating sound waves. In the testing of engines and similar machinery where durability, smoothness, and silence are required, it is necessary to provide a device receptive to such distortions which is easy to handle and which will not dampen or lessen the extent or rate of vibration upon being brought into contact with the surface to be tested.

It is now proposed to provide a pick-up device capable of measuring the rate of displacement of a vibrating surface and which is adaptable for the measurement of high frequency vibrations as well as vibrations in the lower frequency ranges. It is intended to provide a device which is compact in size for ease of handling and greater accessibility. It is further proposed to provide a light weight device which will not tend to dampen or lessen the amount or rate of displacement to enable greater accuracy in determining the responsiveness of structural members to rapid distortions and sound radiation.

In the drawing is shown a cross-sectional side view of a velocity pick-up device embodying the principles of this invention having a suitable indicating means associated therewith and adapted to engage a vibrating test surface.

The pick-up device 8 comprises a casing 10 having a passage 12 formed therethrough. The outer ends 14 and 16 of the casing are threaded to receive closures 18 and 20. Closure 18 is a cup shaped member which is internally threaded for axially adjustable engagement with the end 14 of the casing and has an aperture 22 centrally formed through the closure 18 for supporting a journal bearing 24 therein. Closure 20 also is cup-shaped and is internally threaded for axially adjustable engagement with the end 16 of the casing. A ring member 26 is adapted to be secured by means of threads 27 within one end of the passage 12 adjacent the closure 20 and has a journal bearing 28 mounted therein. A journal bearing 30 is secured within the passage 12 intermediate the ends thereof and is axially aligned with the journal bearings 24 and 28.

An axially movable element 32 is centrally positioned within the passage 12 and is journalled in the bearings 24, 28 and 30. The element 32 comprises a bar magnet 34, a probe member 36, and a stop member 38 axially aligned and secured together by a non-magnetic sleeve 40 formed about the magnet 34 and the adjacent ends of the probe member 36 and stop member 38.

A spring 42 is disposed within one end of the passage 12 and bears against a shoulder 44 formed about the casing 10 and against a collar 46 disposed on the probe member 36. The spring 42 is adapted to hold the collar 46 against the closure 18 and to cause the end 48 of the probe member 36 to extend beyond the closure. A recess 50 is provided within the closure 20 adjacent the other end of the passage 12 to receive and to provide for limited movement of the stop member 38.

A coil of insulated wire 52 is secured within the passage 12 and is disposed about and in spaced relation to one end of the magnet 34. The ends of the coil 52 are adapted to be connected to a suitable voltage indicator means by electrical leads 54 extended through apertures 56 formed in the casing. In the present instance the leads 54 are connected through a voltage amplifier 58 to an oscilloscope 60.

In operation the pick-up device 10 is held in the hand of an operator and the end 48 of the probe member 36 is placed in contact with a vibrating surface such as that indicated at 62. The probe member 36 is axially displaced against the action of the spring 42 causing the element 32 to follow the rapid displacement of the vibrating surface 62 and causing synchronous vibrating movement of the magnet 34. The magnetic lines of force emanating from the end of the magnet 34 within the coil 52 are caused to intersect the coil and to induce therein a voltage which is a function of the rate of movement of the magnet and is readable on the oscilloscope 60.

In practical application it is desirable that the magnet 34 be permanent in character and have lines of force emanating from the ends of the magnet in a transverse direction to a greater extent than with conventional magnetic substances. With such a magnet the position of the magnet within the induction coil 52 is not so critical because the lines of force which transversely intersect the coil are much greater in extent. It is also desirable that the spring 42 biasing the probe member 36 be responsive to the particular vibrational frequencies of the structure under test and for this reason the sensitivity of the pick-up device 8 may be altered by removing the closure 18, withdrawing the element 32, and replacing the spring 42 with a spring of greater or lesser resiliency. The device 8 may then be reassembled in reverse order for further operational use. The tension of a spring 42 may also be further regulated by the threaded adjustment of closure 18 on the end of housing or casing 10.

I claim:

1. In an inspection device including a housing having a passage provided therethrough, an induction coil mounted within said passage and having indicator means connected thereto, and vibration responsive means including a magnetic member disposed within said coil for relative axial movement, said vibration responsive means including a probe member aligned and secured to one end of said magnetic member, a shoulder formed from said housing within said passage, a collar provided upon said probe, calibrated coil spring means disposed concentrically about said probe and between said shoulder and collar for applying a biasing force axially of said vibration responsive means, and closure means removably secured to opposite ends of said housing for retaining said vibration responsive means therein, one of said closure means being formed with an aperture to receive said probe member therethrough and the other of said closure means being disposed to engage said vibration responsive means for limiting the axial travel thereof.

2. In an inspection device as provided for by claim 1, said vibration responsive means further including a stop member axially aligned with and secured to the other end of said magnetic member, said one closure means being engaged by said collar and being adjustable axially of said housing for varying the tension of said spring means.

3. In an inspection device as provided for by claim 1, said vibration responsive means further including a stop member axially aligned with and secured to the other end of said magnetic member, and said other closure means being axially adjustable upon the end of said housing and formed to receive said stop member therein for varying the extent of axial travel permitted said vibration responsive means in accord with different calibrated coil spring means used therewith.

References Cited in the file of this patent

UNITED STATES PATENTS

| | | |
|---|---|---|
| 749,854 | Fahrney | Jan. 19, 1904 |
| 2,002,372 | Greentree et al. | May 21, 1935 |
| 2,070,121 | Gibson | Feb. 9, 1937 |
| 2,074,417 | Olsen | Mar. 23, 1937 |
| 2,300,198 | Brown | Oct. 27, 1942 |
| 2,444,118 | Snyder | June 29, 1948 |
| 2,596,048 | Severs | May 6, 1952 |